United States Patent [19]

Soares et al.

[11] 4,250,024
[45] Feb. 10, 1981

[54] GLASS BEAD SEPARATOR

[75] Inventors: Paul Soares, Belmont; Henry J. Stanley, Sunnyvale, both of Calif.

[73] Assignee: Vacu*Blast Corporation, Belmont, Calif.

[21] Appl. No.: 21,302

[22] Filed: Mar. 15, 1979

[51] Int. Cl.³ .............................................. B07B 1/04
[52] U.S. Cl. ..................................... 209/10; 209/250; 209/254; 209/273; 209/355; 209/413; 51/425
[58] Field of Search ................. 209/10, 250, 254, 273, 209/352, 355, 2, 17, 274, 281, 413, 319; 51/425, 264; 210/314, 295, 294, 335

[56] References Cited

U.S. PATENT DOCUMENTS

| | | | |
|---|---|---|---|
| 3,103,765 | 9/1963 | Nolan | 51/425 |
| 3,122,498 | 2/1964 | Werner | 209/3 |
| 3,363,769 | 1/1968 | Wilmot et al. | 209/413 X |
| 3,633,743 | 1/1972 | Gooding et al. | 209/254 X |

FOREIGN PATENT DOCUMENTS 46-31275  10/1971  Japan ........................ 51/425

Primary Examiner—Ralph J. Hill
Attorney, Agent, or Firm—Owen, Wickersham & Erickson

[57] ABSTRACT

A glass bead separating apparatus and method are disclosed, for use with a slurry blast cabinet. The system is capable of continuous operation, so that glass beads which are broken and undersized can be separated out of the slurry along with debris from the blasting operation, on a continuous basis while blasting takes place, and the slurry can be continuously returned to the blasting cabinet in the purified condition. Used slurry is withdrawn from a hopper at the bottom of the blasting cabinet, pumped up to the top of the separator apparatus and delivered through a nozzle over an inclined screen sized to pass everything but reuseable, whole glass beads. The reuseable beads are collected in a bin, while the remainder passes down onto another, much finer screen which retains nearly everything but the liquid slurry medium, which is preferably water. The relatively clean water drops into a holding tank at the bottom of the separator apparatus, with an overflow weir provided to maintain a preselected water level. The overflow water continuously flows into the collection bin where it is mixed with the reusable beads, and a reconstituted slurry is delivered back to the slurry blast cabinet by gravity flow. Some of the clear water in the holding tank is pumped up to a set of spray nozzles over the inclined screen, and is sprayed onto the slurry to help wash debris off the beads and through the screen. This water falls back into the holding tank.

16 Claims, 4 Drawing Figures

GLASS BEAD SEPARATOR

BACKGROUND OF THE INVENTION

The invention relates to slurry blasting equipment, and more particularly to a separator apparatus and method for removing broken and undersized glass beads and blasting debris from a blasting slurry on a continuous basis while blasting is in progress.

There has been no effective method of separating broken down and undersized glass beads from the useable beads while in a blasting slurry, such as is used in many cases for the surface treatment of materials such as metals. In a dry state, separation of non-useable from useable glass beads has been accomplished rather easily, but separation has been much difficult for a slurry mix of glass beads and liquid, which is normally water. Until the present invention described below, there simply was no known method of efficiently accomplishing such separation, particularly on a continuous basis for supporting a slurry blasting operation.

Other separating apparatus is well known. For example, see U.S. Pat. Nos. 158,808, 1,704,115 and 4,012,316. Some of the prior art discloses classification apparatus including inclined screens, such as U.S. Pat. No. 1,410,340, which is directed to a device for washing and grading sand. U.S. Pat. No. 4,012,316 discloses an apparatus for wet classification of solid particles, including a pump for recirculating the fluid.

An article in the *British Journal of Applied Physics*, Volume III, October 1952, Page 311, entitled "Production and Separation of Small Glass Spheres", discloses a method for separating and classifying small glass bead, but the method is very different from the present invention described below.

SUMMARY OF THE INVENTION

The present invention provides an efficient and uncomplicated solution to the problem of separating a glass bead slurry into useable and unuseable components, and a method for such separation. A separator structure is provided preferably adjacent to the location of the slurry blasting operation, which is usually a slurry blasting cabinet. The working components of the separator structure are elevated, so that once the used slurry is pumped up to near the top of the separator structure, it can ultimately be returned to the blasting cabinet by gravity flow.

Used slurry is withdrawn from a collection area or hopper at the bottom of the slurry blast cabinet and pumped up to a distribution device such as a nozzle near the top of the separator structure. There it is spread onto an inclined screen which is sized to retain only full-sized reuseable glass beads, and to pass the remainder of the slurry. The good beads roll down the screen into an adjacent receiving bin. The angle of the inclined screen is adjustable and screens of different mesh size may be interchanged, to accommodate different size beads.

The material which passes through the inclined screen falls down to another separation device, preferably a second screen which is mounted horizontally. This screen, of a much finer mesh size, retains substantially everything except the liquid medium, and it may be removed from time to time for cleaning. Just below this second separator is a holding tank or hopper for relatively clear liquid. To maintain a constant liquid level in this hopper, there is provided an overflow weir at one side, from which excess liquid flows into the receiving bin to mix with the reuseable glass beads entering from the inclined separator screen. In the receiving bin, the liquid and good beads are mixed, and the reconstituted slurry is delivered back to the blasting cabinet by gravity flow.

The first screening operation is preferably aided by the spraying of relatively clear liquid over the bead slurry as it is delivered onto the screen. The clear liquid is pumped from the liquid storage tank up to nozzles positioned over the inclined screen, and the liquid of course returns to the tank after passing through both screens.

A portion of the clear liquid in the tank may also be drawn off and injected into the used slurry withdrawn from the blast cabinet, to dilute the slurry in its delivery up to the first separator screen. Thus, this withdrawn portion of the liquid is also returned directly to the liquid holding tank.

The entire operation is continuous, thus insuring a constant supply of useable glass beads in the slurry blast cabinet without altering the characteristics of the slurry mix.

Accordingly, in one embodiment of the invention a continuous bead separator for use with glass bead slurry blasting comprises a useable bead separator screen sized to retain useable beads but to pass the remainder of the slurry, conduit and pump means for taking used slurry from the blasting operation and lifting and delivering it onto the separator screen, second separator means below the useable bead separator screen for separating out undersized beads and debris, and passing relatively clear liquid, holding means for retaining the clear liquid passed from the second separator means, means for removing the useable beads from the useable bead separator screen, means for mixing the clear liquid from the second separator with the removed useable beads to reconstitute a slurry, and a return conduit for delivering the reconstituted slurry back to the blasting operation.

It is therefore among the objects of the invention to provide an efficient apparatus and method for continuously separating and cleaning the glass bead slurry used in a slurry blasting operation, without appreciably changing the constituency of the slurry mix and without interruption of blasting. This and other objects, advantages and features of the invention will be apparent from the following description of a preferred embodiment, taken in conjunction with the accompanying drawings.

DESCRIPTION OF A PREFERRED EMBODIMENT

Figure 1:
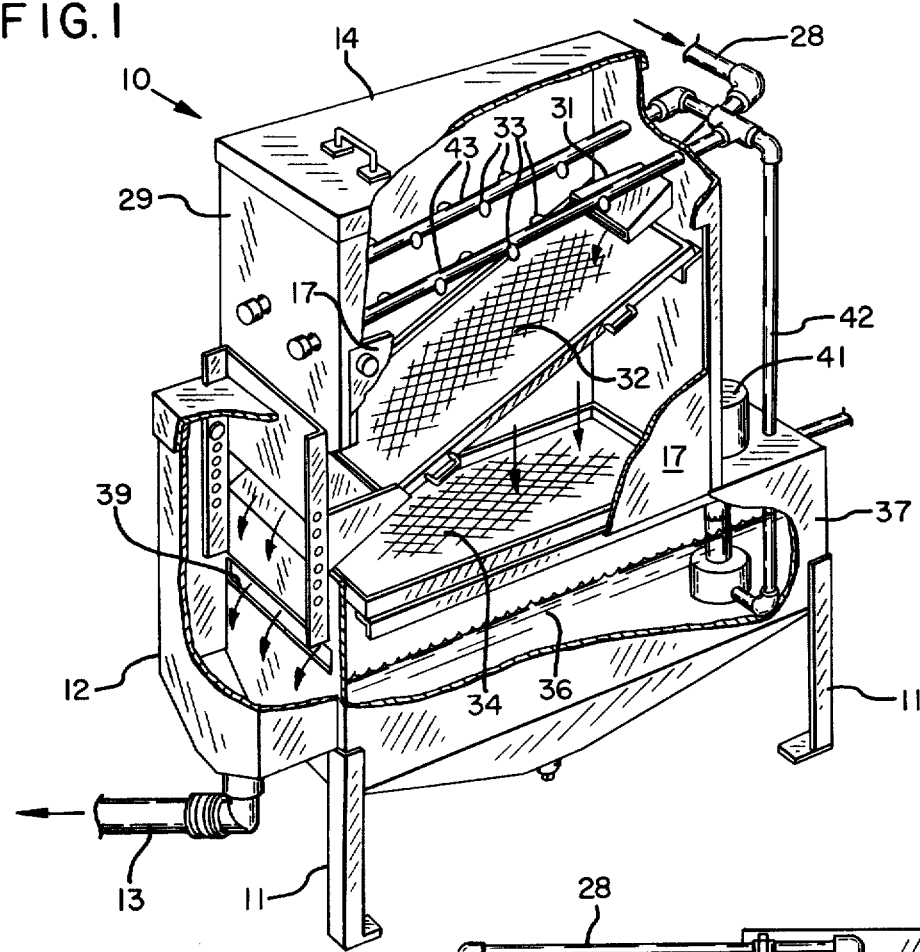
FIG. 1 is a perspective view, partially broken away, showing the glass bead separating apparatus of the invention.

In the drawings, FIG. 1 shows the glass bead slurry separator apparatus 10 in the perspective view. The structure 10 includes legs 11 to elevate the working portion of the apparatus sufficiently for gravity flow of reconstituted slurry from a receiving bin 12 through a return conduit 13 back to the point of slurry use, which is normally a slurry blast cabinet. As indicated, the separator apparatus 10 includes a removable cover 14 and a removable panel 17 for access to separator screens within the enclosure, described below.

Figure 2:
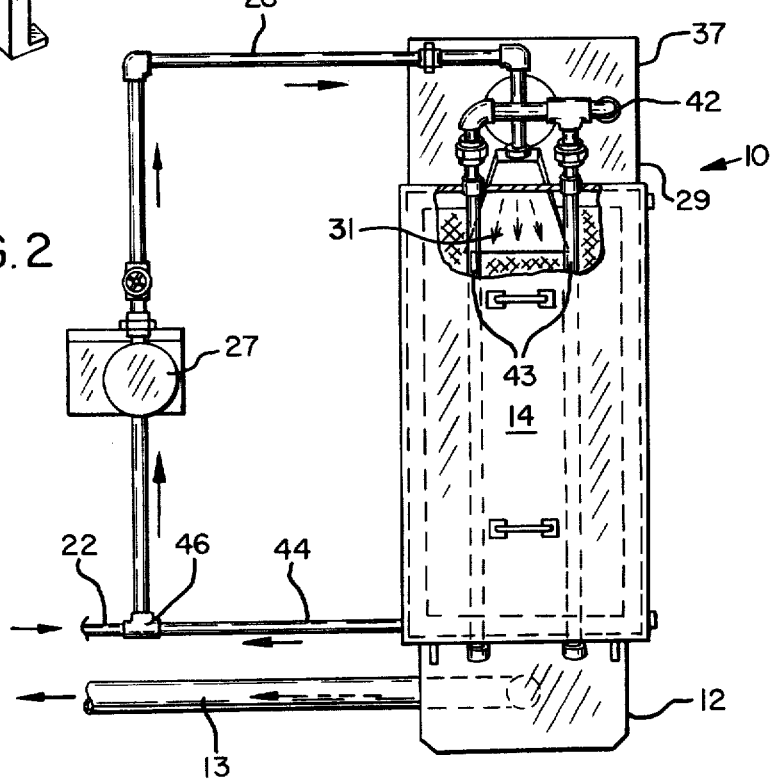
FIG. 2 is a plan view of the apparatus.
Figure 3:
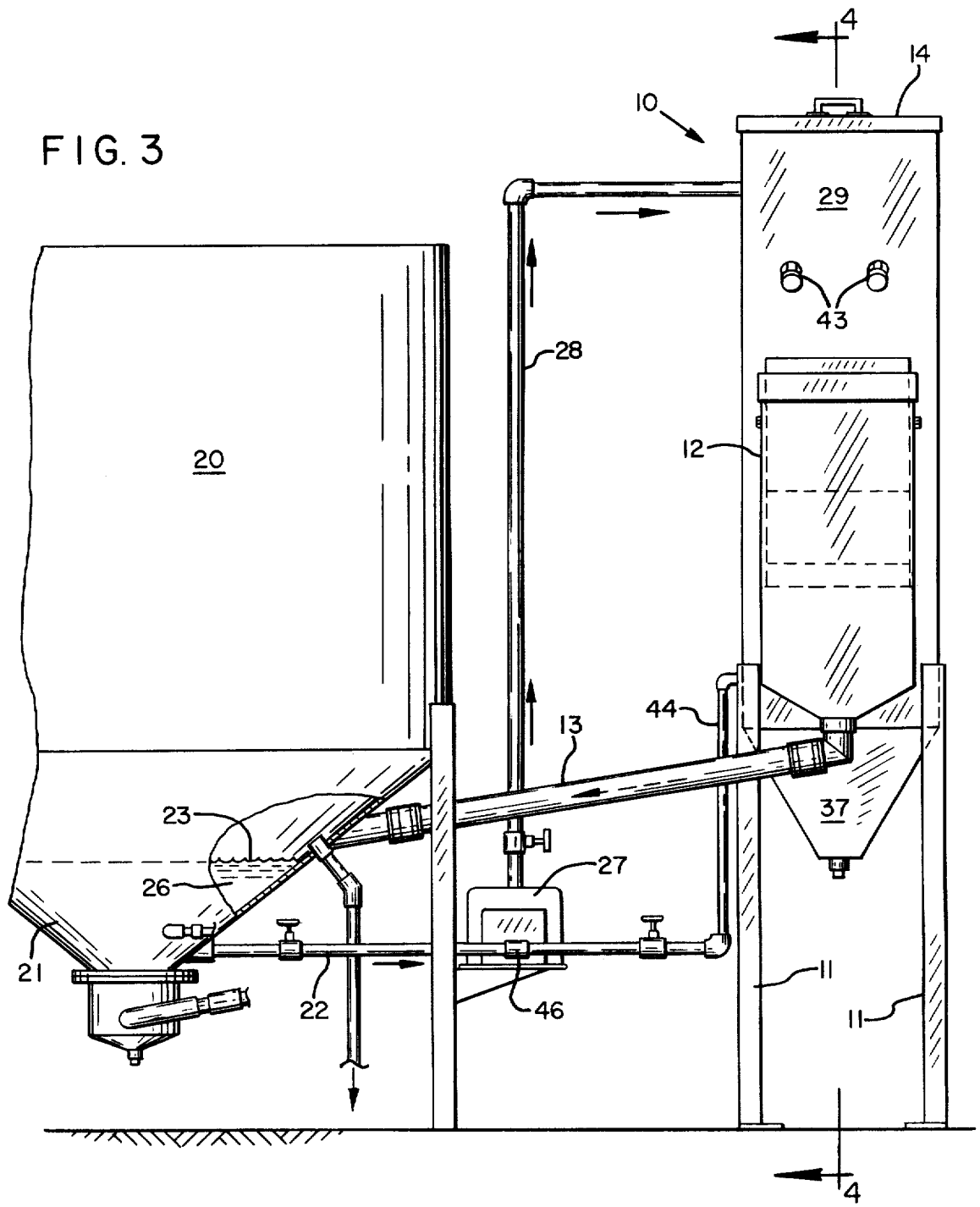
FIG. 3 is an elevation view of the apparatus, shown in conjunction with a slurry blast cabinet.
Figure 4:
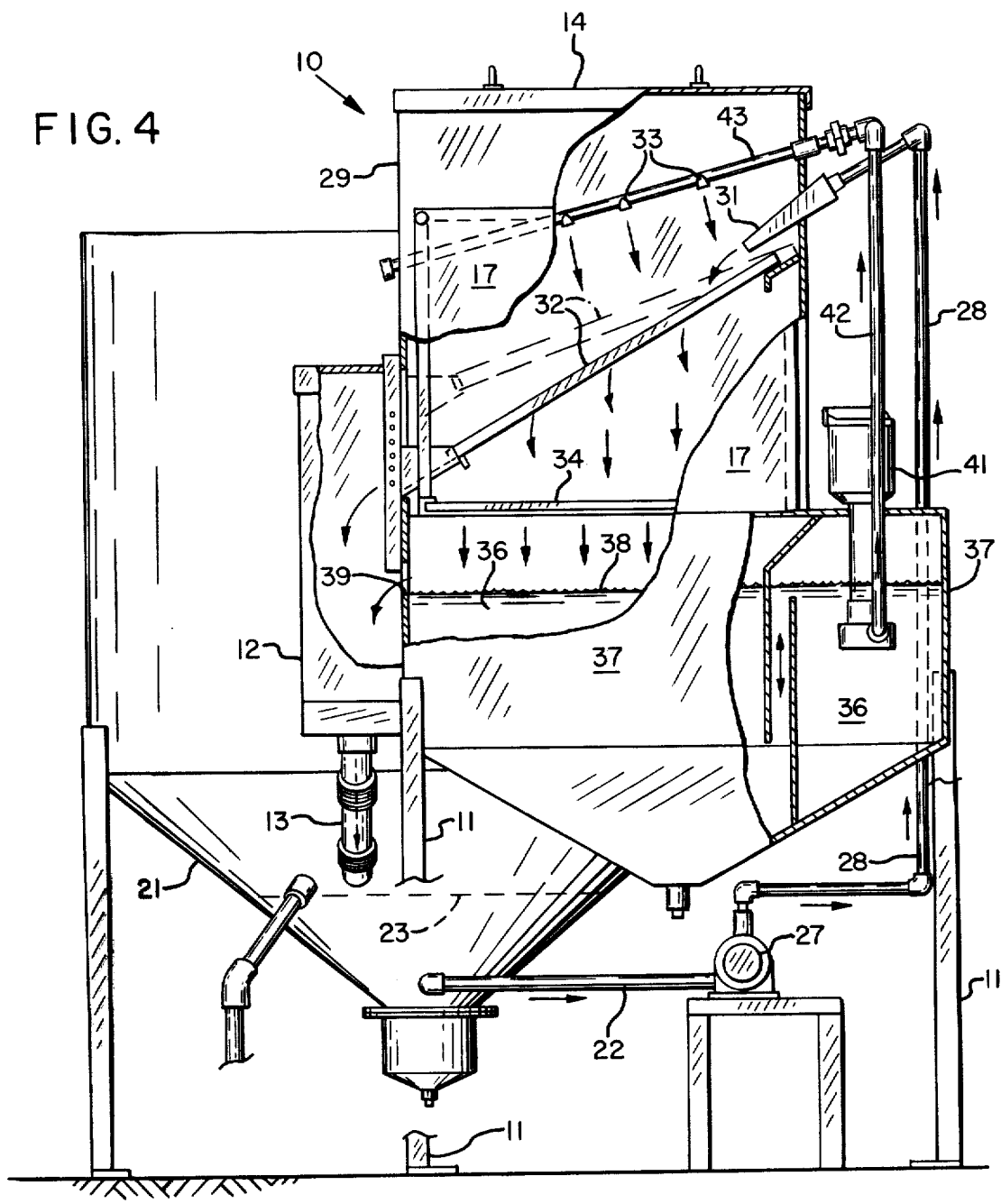
FIG. 4 is a partially sectioned side elevation view of the apparatus, taken along the line 4—4 of FIG. 3.

FIGS. 2, 3 and 4 show the working features of the separating apparatus 10. As indicated, the separator 10 is preferably associated with a slurry blast cabinet 20 within which surface treatment of various items is accomplished, using a blasting slurry which may be constituted of small glass beads in water. However, the separator 10 is not limited to use with a blasting cabinet 20; it may be associated with any slurry blasting operation wherein the used slurry is collected and wherein it is desirable to separate out broken and undersized beads and other blasting debris during operation.

The cabinet 20 includes some form of slurry collection area such as a hopper 21 at its bottom, best seen in FIG. 3. From near the bottom of the hopper extends a slurry exit conduit 22, and at a higher point on the hopper, above the normal liquid level indicated at 23, the slurry return conduit 13 enters. The remaining details of the slurry blast cabinet 20 do not form a part of the invention. Simply stated, slurry 26 in the cabinet hopper 21 is used for blasting, then falls back to the hopper.

The separator apparatus 10 includes a pump 27, which may be a centrifugal pump, connected to the slurry line 22 leading from the cabinet, for pumping the used slurry up a line 28 to an elevated position in a cabinet 29 of the separator. The pump 27 delivers the slurry preferably through a fan-shaped nozzle 31 to a separator screen 32 which is sized to retain useable beads but to pass the remainder of the slurry mix, by gravity. As illustrated, the screen 32 is inclined, so that the useable beads of the slurry roll and wash down to the left as viewed in FIG. 4, and into the collection bin or hopper 12 at one end of the apparatus. The screen 32 is preferably adjustable as to its inclination, and it is replaceable with a screen of different mesh size, so that different size blasting media can be accommodated. Typically, the screen 32 is of about a No. 40 mesh size, to separate out typically sized glass beads used in slurry blasting. However, larger or smaller beads can be separated with the illustrated apparatus, with appropriate adjustment of the screen size and angle of inclination.

To aid in the process of separation at the separator screen 32, there may be provided a series of liquid spray nozzles 33 for spraying medium liquid over the used slurry deposited on the screen. The relatively clear liquid sprayed over the deposited slurry helps wash the broken and undersized beads and other debris through the screen and down to a second separator device 34, which preferably also comprises a screen, but one of much finer mesh. The screen 34 may be of about No. 160 mesh, or about No. 100 mesh with cloth. This screen retains the undersized and broken down shot, and other debris of the blasting operation, and passes only relatively clean liquid. This screen is of course accessible for removal and cleaning via the removable panel 17 (see also FIG. 1). Similarly, access to the first separator screen 32 is provided via the removable panel 17.

The relatively clear liquid 36 passing through the second separator is collected in a holding tank 37 below, as illustrated. The tank extends outwardly from the separator cabinet 29 at one end, opposite the end supporting the receiving hopper 12. A liquid level 38 is maintained in the tank 37 by an overflow weir 39, over which the relatively clear liquid flows into the receiving bin or hopper 12 to mix with the separated out reuseable shot to reconstitute a slurry, which then passes by gravity through the return conduit 13 back to the blasting operation, i.e. the blast cabinet hopper 21.

A pump 41 connected into the liquid holding tank 37 delivers relatively clear liquid 36 up a line 42 to manifold conduits 43 connected to and supporting the series of spray nozzles 33. Thus, the sprayed liquid is returned to the holding tank 37, in a brief cycle.

There may also be provided a line 44 from the clear liquid holding tank to the used slurry pump 27 or to a juncture 46 (see FIGS. 2 and 3) with the used slurry line 22. This line 44 adds a desired amount of additional liquid to the used slurry so that it may be better pumped up the line 28 and more effectively separated at the separator screen 32.

The entire separation and cleaning operation is continuous, so that a constant supply of slurry with useable glass beads is insured for the slurry blast cabinet, without alteration of the slurry mix characteristics. Neither liquid nor beads need be added to the system except as required by the eventual attrition of an appreciable number of beads by breakage and wear, or due to evaporation of the slurry medium.

The above described preferred embodiment provides a continuously operation glass bead separation apparatus and method for use with slurry blasting, efficient yet simple, and capable of returning a cleaned slurry of substantially constant constituency. Other embodiments and variations to this preferred embodiment will be apparent to those skilled in the art and may be made without departing from the spirit and scope of the following claims.

I claim:

1. A continuous bead separator for use with glass bead slurry blasting wherein blasting takes place at a blasting location and the used slurry, including reusable beads, some broken and undersized beads, and other debris from the blasting operation, is collected in a hopper, comprising:

a frame;

a useable bead separator screen sized to retain useable beads but to pass the remainder of the slurry, mounted on the frame at an oblique angle so that the separated useable beads travel down and off the lower end of the screen by gravity;

conduit and pump means for taking used slurry from the blasting location hopper and lifting and delivering it onto the useable bead separator screen as a slurry;

second separation means below the useable bead separator screen for separating out undersized beads and debris, and producing relatively clear liquid;

holding means for containing said relatively clear liquid from the second separator means;

means for spraying said relatively clear liquid from the holding means over the useable bead separator screen as the used slurry progresses down the screen to help separate and wash the useable beads from the slurry, with the sprayed liquid dropping and returning to the clear liquid holding means following spraying;

means for mixing relatively clear liquid from the second separator means with the removed useable beads to reconstitute a slurry; and return conduit means for delivering the reconstituted slurry back to the blasting location.

2. The separator apparatus of claim 1, further including means for adjusting the angle of tilt of the useable bead separator screen.

3. The separator apparatus of claim 1, further including a receiving bin adjacent to the lower end of the useable bead separator screen, positioned to receive the separated out useable beads, and an overflow weir in the clear liquid holding means positioned to overflow relatively clear liquid into the receiving bin, said receiving bin serving as said mixing and slurry reconstituting means.

4. The separator apparatus of claim 1, further including a conduit leading from the clear liquid holding means to the conduit and pump means, for diluting the used slurry before it is lifted and delivered on to the useable bead separator screen.

5. The separator apparatus of claim 1, wherein the conduit and pump means includes a generally fan-shaped nozzle for delivering the used slurry onto the useable bead separator screen.

6. The separator apparatus of claim 1 wherein the second separation means comprises a generally horizontally positioned screen of smaller mesh size than the useable bead separator screen above, and including means facilitating removal of the smaller mesh screen for periodic cleaning.

7. The separator apparatus of claim 1 wherein the blasting location is a separate slurry blasting cabinet with a bottom slurry collection hopper maintained at a generally constant liquid level during blasting, said return conduit means from the separator being connected to the slurry collection hopper near the level of the liquid and said conduit and pump means being connected to withdraw slurry from near the bottom of the slurry collection hopper.

8. The separator apparatus of claim 7, wherein the clear liquid holding means and the mixing and reconstituting means are positioned at a higher elevation than the liquid level in the blasting cabinet collection hopper, so that the reconstituted slurry is returned to the collection hopper by gravity flow.

9. The separator apparatus of claim 1 wherein the mixing and slurry reconstituting means is positioned at a higher elevation than the hopper associated with the blasting location, so that the reconstituted slurry is returned to the hopper by gravity flow.

10. A method for continuously separating a glass bead blasting slurry to remove broken and undersized beads and other debris from a blasting operation, comprising:

withdrawing used slurry from a collection area associated with the blasting operation;

delivering the used slurry onto an inclined separator screen sized to retain useable beads but to pass the remainder of the slurry;

collecting the retained useable beads moving down the inclined screen in a collection bin;

conducting the material passed through the separator screen down to a second separation station, and there separating out broken and undersized beads and other blasting debris, and passing relatively clear liquid;

collecting the relatively clear liquid in a holding hopper;

continuously drawing off a portion of the liquid from the holding hopper and mixing it with the collected useable beads in the collection bin, thereby reconstituting a slurry; and using the reconstituted slurry in the blasting operation.

11. The method of claim 10 which further includes continuously spraying a portion of the liquid from the holding hopper over the slurry on the inclined separator screen to wash debris off the useable beads, with the debris and liquid being separated at the second separation station, so that the liquid is returned to the holding hopper.

12. The method of claim 10, further including withdrawing a portion of the liquid from the holding hopper and adding it to the used slurry withdrawn from the collection area, to dilute the slurry before delivering it onto the separator screen.

13. The method of claim 10 wherein the delivery step comprises lifting the used slurry with a pump to an elevated position at which the inclined separator screen is located.

14. The method of claim 10 wherein the separation out of broken and undersized beads and other debris comprises conducting the material through a horizontally positioned separator screen of finer mesh than the first separator screen, the horizontal screen being removable for cleaning.

15. The method of claim 10 wherein the step of continuously drawing off a portion of the liquid of the liquid from the holding hopper comprises passing overflow liquid from the holding hopper over a weir and into the collection bin to be mixed with the useable beads.

16. The method of claim 10 wherein the reconstituted slurry is passed by gravity from the collection bin back to the blasting operation.

* * * * *